(12) United States Patent
Sun et al.

(10) Patent No.: US 9,116,605 B2
(45) Date of Patent: Aug. 25, 2015

(54) SYSTEM AND METHOD FOR GENERATING EVENT DISTRIBUTION INFORMATION

(71) Applicant: Tencent Technology (Shenzhen) Company Limited, Shenzhen (CN)

(72) Inventors: Huanwen Sun, Shenzhen (CN); Yuning Wen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 94 days.

(21) Appl. No.: 14/083,139

(22) Filed: Nov. 18, 2013

(65) Prior Publication Data
US 2014/0089797 A1    Mar. 27, 2014

Related U.S. Application Data

(63) Continuation of application No. PCT/CN2013/082419, filed on Aug. 28, 2013.

(30) Foreign Application Priority Data

Sep. 3, 2012    (CN) .......................... 2012 1 0321561

(51) Int. Cl.
G06F 17/00    (2006.01)
G06F 19/00    (2011.01)
G06F 3/0484    (2013.01)
H04N 21/43    (2011.01)
H04N 21/854    (2011.01)

(52) U.S. Cl.
CPC .......... *G06F 3/0484* (2013.01); *H04N 21/4307* (2013.01); *H04N 21/85406* (2013.01)

(58) Field of Classification Search
CPC ............. G06F 3/0484; H04N 21/4307; H04N 21/85406
See application file for complete search history.

(56) References Cited

FOREIGN PATENT DOCUMENTS

CN    1471305 A    1/2004
CN    101640058 A    2/2010

OTHER PUBLICATIONS

Tencent Technology (Shenzhen) Company Limited, International Search Report and Written Opinion, PCT/CN2013/082419, Dec. 5, 2013, 10 pgs.

*Primary Examiner* — Rong Le
(74) *Attorney, Agent, or Firm* — Morgan, Lewis & Bockius LLP

(57) ABSTRACT

A computer system and method for generating event distribution information using an audio file and controlling events corresponding to the user inputs based on the event distribution information. The computer-implemented method includes: extracting a predefined number of event-triggering times from event distribution information, wherein the event distribution information is associated with an audio file currently played on the computer and the event-triggering times are arranged in a sequential order; determining a current play time for the audio file; and controlling event locations corresponding to user inputs on the display of the computer based on a comparison of the current play time and the extracted event-triggering times.

15 Claims, 4 Drawing Sheets

SYSTEM AND METHOD FOR GENERATING EVENT DISTRIBUTION INFORMATION

RELATED APPLICATIONS

This application is a continuation application of PCT Patent Application No. PCT/CN2013/082419, entitled "SYSTEM AND METHOD FOR GENERATING EVENT DISTRIBUTION INFORMATION," filed on Aug. 28, 2013, which claims priority to Chinese Patent Application No. 201210321561.2, "SYSTEM AND METHOD FOR GENERATING EVENT DISTRIBUTION INFORMATION USING AN AUDIO FILE," filed on Sep. 3, 2012, both of which are hereby incorporated by reference in their entirety.

FIELD OF THE INVENTION

The present invention generally relates to the processing of audio files, in particular to system and method for generating event distribution information using an audio file and controlling events corresponding to the user inputs based on the event distribution information.

BACKGROUND OF THE INVENTION

More and more mobile applications have audio features when providing various functions to end users. For example, an application often deploy many locations on a graphical user interface for receiving user inputs in accordance with the rhythm from an audio file being played on a mobile device (e.g., a smartphone or a tablet computer). Based on the user interactions (e.g., finger touches) with the locations, the application provides a user-friendly environment. For example, in a game application that plays music concurrently, multiple locations are deployed at each image frame of the game application based on the music's rhythm so as to generate user inputs based on the user interactions with the deployed locations. Very often, a deployed location corresponds to a moving object that moves on the graphical user interface based on the music being played. More specifically, a specific location, which is associated with a particular frame of the application, is often mapped to a set of data in the audio file that generates the music. The set of data identifies the tempo of the frames of the application as well as the locations corresponding to the tempo. For example, the movement speed of a location may be measured and controlled by the cumulative time of rendering the frames of the application. In other words, if the cumulative time of the frames matches the falling time of a corresponding location defined in the data, the location is rendered on the graphical user interface. However, because the cumulative time of rendering the frames of the application is calculated on a per-frame basis, this approach would inevitably accumulate the errors associated with the respective frames. As a result, when the accumulated errors are great enough, there could be a time gap of multiple seconds between the music being played and the corresponding movement of the locations on the graphical user interface.

SUMMARY

The above deficiencies and other problems associated with the conventional approach of synchronizing audio plays and video plays of an application are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer having one or more processors, memory and a display. The computer-implemented method includes: extracting a predefined number of event-triggering times from event distribution information, wherein the event distribution information is associated with an audio file currently played on the computer and the event-triggering times are arranged in a sequential order; determining a current play time for the audio file; and controlling event locations corresponding to user inputs on the display of the computer based on a comparison of the current play time and the extracted event-triggering times.

Another aspect of the invention involves a computer system. The computer system includes memory, one or more processors, and one or more programs stored in the memory and configured for execution by the one or more processors. The one or more programs include: extracting a predefined number of event-triggering times from event distribution information, wherein the event distribution information is associated with an audio file currently played on the computer and the event-triggering times are arranged in a sequential order; determining a current play time for the audio file; and controlling event locations corresponding to user inputs on the display of the computer based on a comparison of the current play time and the extracted event-triggering times.

Another aspect of the invention involves a non-transitory computer readable storage medium having stored therein instructions, which when executed by a computer system cause the computer system to: extract a predefined number of event-triggering times from event distribution information, wherein the event distribution information is associated with an audio file currently played on the computer and the event-triggering times are arranged in a sequential order; determine a current play time for the audio file; and control event locations corresponding to user inputs on the display of the computer based on a comparison of the current play time and the extracted event-triggering times.

Some embodiments may be implemented on either the client side or the server side of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
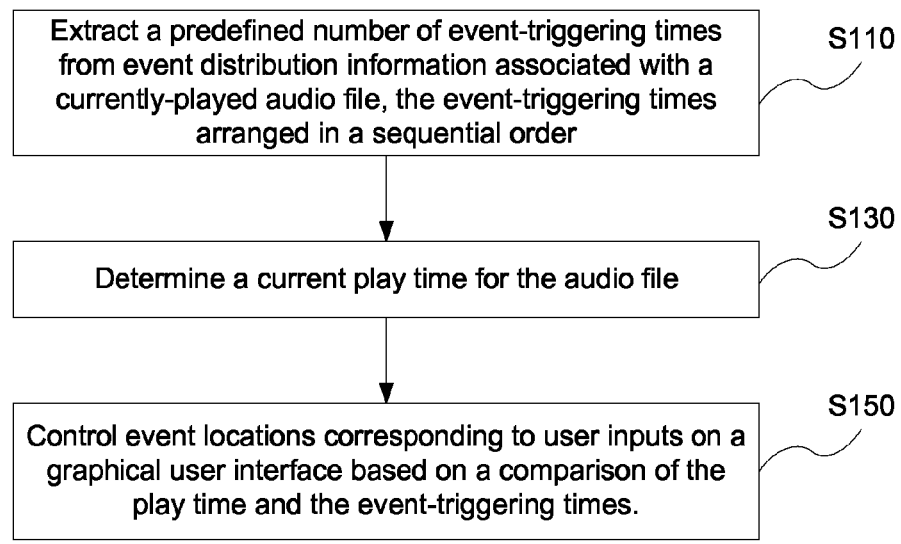
FIG. 1 is a flow chart illustrative of a method of controlling the distribution of events on a graphical user interface of an application based on an audio file in accordance with some embodiments.

FIG. 1 is a flow chart illustrative of a method of controlling the distribution of events on a graphical user interface of an application based on an audio file in accordance with some embodiments.

In order to realize the synchronization between the audio play and the video play associated with the application, at step S110, the application extracts a predefined number of event-triggering times from event distribution information associated with a currently-played audio file, the event-triggering times arranged in a sequential order.

In some embodiments, the event distribution information is generated by pre-processing an audio file, identifying one or more events in the audio file, and recording an event-triggering time for each identified event. For example, an event is identified when a predefined music note or a predefined sequence of music notes is found in the audio file and the event-triggering time corresponds to the start time of playing the music note or the sequence of music notes. When the application plays an audio file, it extracts a predefined number of event-triggering times from the event distribution information associated with the music file. For example, the event-triggering times in the event distribution information are organized in a temporally sequential order from earlier to later and the extracted event-triggering times are also in the same sequential order. In some embodiments, the number of event-triggering times extracted from the event distribution information is determined by the soundtrack data of the audio file.

In some embodiments, the extraction of event-triggering times is tied with the video play of the application. For example, for each frame of the video play, the application determines its play time period and then correlates the play time period with the audio file to select from the event distribution information event-triggering times within the corresponding play time period in a temporally sequential order. In this case, when the audio file is played by the application, a corresponding set of frames are also played frame by frame by the application concurrently. As a result, the event-triggering times extracted from the event distribution information are always in synch with the corresponding frame rendered on the display of a computing device on which the application is running.

In some embodiments, during the play of the audio file, one image frame is displayed for a predefine period of time and then replaced by a subsequent image frame, each image frame corresponding to one or more music notes. Because a music note is comprised of events corresponding to multiple soundtracks, each image frame can be mapped to one or more events of the corresponding soundtracks. Moreover, each event-triggering time should correspond to the graphical user interface of a specific frame and thus achieve the mapping or synchronization between the frame update of the video play and the corresponding rhythm of the audio play.

At step S130, the application determines a current play time for the audio file. In some embodiments, the current play time indicates the current position of the playing the audio file, which indicates the amount of time that has lapsed from the start time of playing the audio file.

At step S150, the application controls event locations corresponding to user inputs on a graphical user interface based on a comparison of the play time and the event-triggering times. In some embodiments, the location of an event is pre-determined by a location on the graphical user interface of a frame corresponding to the event-triggering time specified in the audio file. When a user generates an input at or near the event location, the frame corresponding to the event-triggering time is also updated accordingly. For example, in a game application, the application of the extracted event-triggering times to the game application causes the generation of multiple event locations on the graphical user interface of the game application. By tapping on a particular event location on the graphical user interface during the audio play, a particular music note or notes are generated by the application, resulting an effect like a user is playing an instrument by pressing different keys of the instrument.

By controlling the events and corresponding locations on the graphical user interface through the correlation of the playing time of the audio file and the event-triggering times, the application can achieve a better synchronization result between the audio play and the video play. In particular, because the play time of the audio file corresponds to the current playing position of the audio file that can be retrieved from the audio file, there is no error introduced like the accumulation of play times associated with different frames. Since the event-triggering times are derived from the play times of events identified in the audio file, they do not include any error either, the correlation of the two can improve the accuracy of the event locations on the graphical user interface based on the audio file. In some embodiments, the application compares an event-triggering time with the play time of the audio file to determine whether the event-triggering time is before or after the play time of the audio file. If the event-triggering time is after the play time, the application then identifies a location on the graphical user interface corresponding to the event and controls the display of the user inputs at the location. If not, the application may skip this event-triggering time.

In other words, the determination that the event-triggering time is after (or greater than) the play time indicates that there is no time delay for controlling the display of user inputs at the corresponding location associated with the event-triggering time. In this case, the application invokes the control of the display at the location based on the user inputs. For example, in a game application, the event location may be displayed in format of a moving object on the graphical user interface. In this case, if the event-triggering time is greater than the play time of the audio file, the application generates the object on the graphical user interface and also displays its movement effect. On the other hand, the determination that the event-triggering time is before (or less than) the play time indicates that the event associated with the event-triggering time has been passed or missed, the application usually takes no further action. In other words, the application does not control the display at the corresponding location regardless of whether there is any user input or not. By doing so, the application avoids playing a music note from the audio file that is incompatible with the frame currently displayed. When the application moves to render the next frame, it then extracts the event-triggering event corresponding to the next frame and performs similar operations as described above in order to control of the display of the event locations associated with the next frame.

In some embodiments, before the extraction step S110, the application extracts the header data and soundtrack data from the audio file and then generates the event distribution information based on the header data and the soundtrack date. For example, the audio file may be in the format of MIDI (Musical Instrument Digital Interface) that includes both header data and soundtrack data. In particular, the header data records the formation of the audio file as well as multiple parameters such as BPM (Beats Per Minute) representing the play speed of the audio file. In some embodiments, the soundtrack data includes information about the type of instruments for playing music notes corresponding to a particular event, the pitch of the tone, the accompany information as well as the time slice information associated with the event. The input of the soundtrack data into a synthesizer generates the play of a particular music note or notes associated with the event.

In some embodiments, the event-triggering time of a particular event in the audio file is determined based on the parameters in the header data and the time slice information of the event in the soundtrack data. Such event-triggering time is then used for generating the event distribution information. Besides the event-triggering time, the event distribution information also includes information indicating the time length of this event, which is used for controlling the time length of playing music notes associated with the event as well as the time length of displaying the event location on the graphical user interface. In some embodiments, the time length of this event is determined by subtracting the event's start time from its termination time provided by the soundtrack data.

Figure 2:
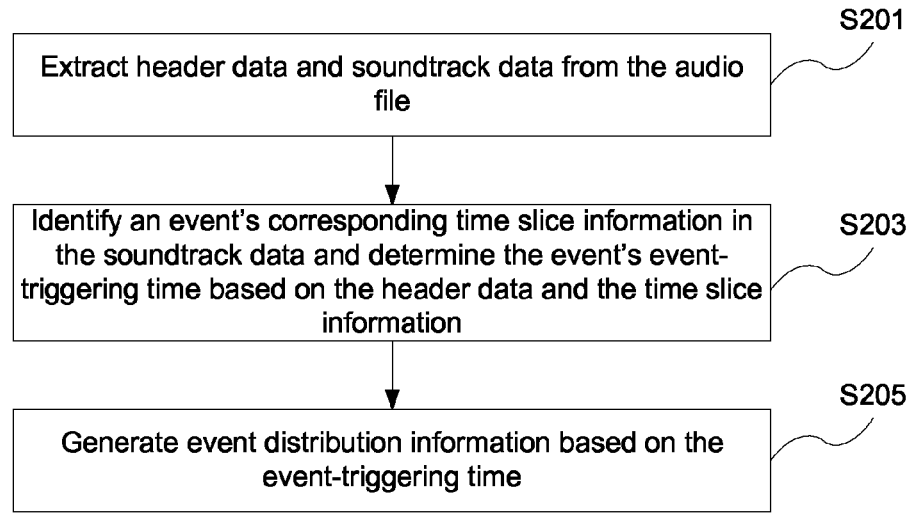
FIG. 2 is a flow chart illustrative of a method of extracting header and soundtrack data from the audio file and using such data to generate the event distribution information for corresponding events in the audio file in accordance with some embodiments.

FIG. 2 is a flow chart illustrative of a method of extracting header and soundtrack data from the audio file and using such data to generate the event distribution information for corresponding events in the audio file in accordance with some embodiments.

At step S201, the application extracts the header data and the soundtrack data from the audio file, which are used for generating the event distribution information as described above. At step S203, the application extracts the time slice information of an event from the soundtrack data and then determines the event's event-triggering time based, at least in part, on the header data and the time slice information. In some embodiments, the unit for the time slice information in the audio file is the number of ticks. As such, the event-triggering time indicates when an event should occur after a predefined number of ticks. In some embodiments, the application determines the unit of a tick in time based on parameters such as BPM in the header data of the audio file. Next, the application extracts the time slice information from the soundtrack and the parameters from the header data and uses such information to determine an event-triggering time for each event identified in the audio file.

At Step S205, the application generates the event distribution information using the event-triggering times determined in the previous steps. In some embodiments, there is a counterpart in the event distribution information for every event in the audio file. The event distribution information is then used for controlling the event locations during the play of the audio file as described above. In some embodiments, a soundtrack event distribution set is generated by storing the event-triggering times corresponding to different events in the set in the binary stream format in order to save the storage space. More specifically, since an audio file may include multiple sound tracks, the event distribution information is generated by combining multiple soundtrack event distribution sets, one for each soundtrack.

The description above focuses on the method of controlling the display of event locations on a graphical user interface based on an audio file. The description below focuses more on a specific example, i.e., a music game application. An audio file is used for generating music for the music game application. When a user plays the music game application, the application automatically extracts event-triggering times from the event distribution information and compares them with the current play time of the audio file so as to control the display of corresponding event locations on the graphical user interface and generate corresponding music notes based on the user inputs through the event locations.

Figure 3:
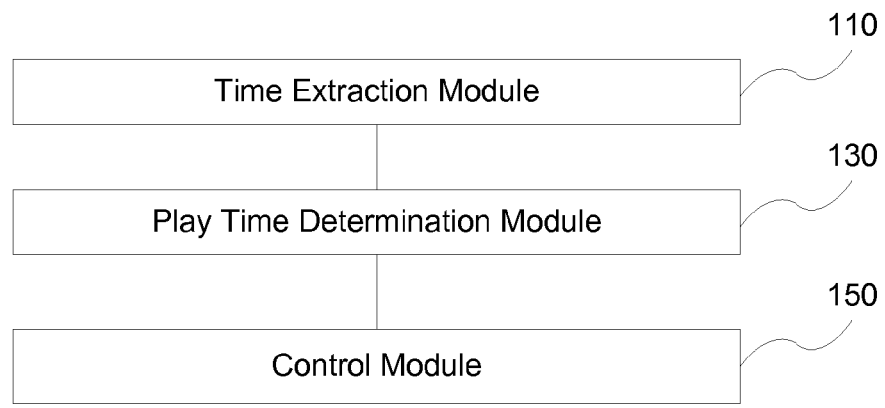
FIG. 3 is a block diagram illustrative of a system for implementing a method of controlling the distribution of events on a graphical user interface of an application based on an audio file in accordance with some embodiments.

FIG. 3 is a block diagram illustrative of a system for implementing a method of controlling the distribution of events on a graphical user interface of an application based on an audio file in accordance with some embodiments. In this example, the system includes a time extraction module 110, a play time determination module 130, and a control module 150. The time extraction module 110 is configured to extract a predefined number of event-triggering times from event distribution information associated with a currently-played audio file in a sequential order.

In some embodiments, the event distribution information is generated by pre-processing an audio file, identifying one or more events in the audio file, and recording an event-triggering time for each identified event. For example, an event is identified when a predefined music note or a predefined sequence of music notes is found in the audio file and the event-triggering time corresponds to the start time of playing the music note or the sequence of music notes. When the application plays an audio file, the time extraction module 110 extracts a predefined number of event-triggering times from the event distribution information associated with the music file. For example, the event-triggering times in the event distribution information are organized in a temporally sequential order from earlier to later and the extracted event-triggering times are also in the same sequential order. In some embodiments, the number of event-triggering times extracted from the event distribution information is determined by the soundtrack data of the audio file.

In some embodiments, the extraction of event-triggering times is tied with the video play of the application. For example, for each frame of the video play, the time extraction module 110 determines its play time period and then correlates the play time period with the audio file to select from the event distribution information event-triggering times within the corresponding play time period in a temporally sequential order. In this case, when the audio file is played by the application, a corresponding set of frames are also played frame by frame by the application concurrently. As a result, the event-triggering times extracted from the event distribution information are always in synch with the corresponding frame rendered on the display of a computing device on which the application is running.

In some embodiments, during the play of the audio file, one image frame is displayed for a predefine period of time and then replaced by a subsequent image frame, each image frame corresponding to one or more music notes. Because a music note is comprised of events corresponding to multiple soundtracks, each image frame can be mapped to one or more events of the corresponding soundtracks. Moreover, each event-triggering time should correspond to the graphical user interface of a specific frame and thus achieve the mapping or synchronization between the frame update of the video play and the corresponding rhythm of the audio play.

The play time determination module 130 is configured to determine a current play time for the audio file. In some embodiments, the current play time indicates the current position of the playing the audio file, which indicates the amount of time that has lapsed from the start time of playing the audio file.

The control module 150 is configured to control event locations corresponding to user inputs on a graphical user interface based on a comparison of the play time and the event-triggering times. In some embodiments, the location of an event is pre-determined by a location on the graphical user interface of a frame corresponding to the event-triggering time specified in the audio file. When a user generates an input at or near the event location, the frame corresponding to the event-triggering time is also updated accordingly. For example, in a game application, the control module 150 applies the extracted event-triggering times to the game application causes the generation of multiple event locations on the graphical user interface of the game application. By tapping on a particular event location on the graphical user interface during the audio play, a particular music note or notes are generated by the application, resulting an effect like a user is playing an instrument by pressing different keys of the instrument.

By controlling the events and corresponding locations on the graphical user interface through the correlation of the playing time of the audio file and the event-triggering times, the control module 150 achieves a better synchronization result between the audio play and the video play. In particular, because the play time of the audio file corresponds to the current playing position of the audio file that can be retrieved from the audio file, there is no error introduced like the accumulation of play times associated with different frames. Since the event-triggering times are derived from the play times of events identified in the audio file, they do not include any error either, the correlation of the two can improve the accuracy of the event locations on the graphical user interface based on the audio file. In some embodiments, the control module 150 compares an event-triggering time with the play time of the audio file to determine whether the event-triggering time is before or after the play time of the audio file. If the event-triggering time is after the play time, the control module 150 then identifies a location on the graphical user interface corresponding to the event and controls the display of the user inputs at the location. If not, the control module 150 may skip this event-triggering time.

Figure 4:
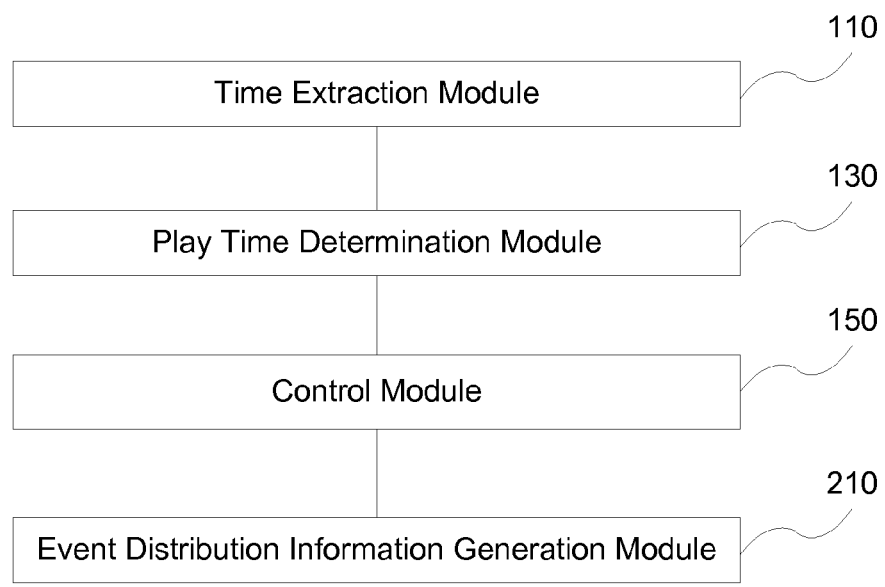
FIG. 4 is a block diagram illustrative of a system for implementing a method of extracting header and soundtrack data from the audio file and using such data to generate the event distribution information for corresponding events in the audio file in accordance with some embodiments.

FIG. 4 is a block diagram illustrative of a system for implementing a method of extracting header and soundtrack data from the audio file and using such data to generate the event distribution information for corresponding events in the audio file in accordance with some embodiments. Compared with the embodiments described above in connection with FIG. 3, this embodiment also includes an event distribution information generation module 210.

In some embodiments, the event distribution information generation module 210 is configured to extract the header data and soundtrack data from the audio file and then generates the event distribution information based on the header data and the soundtrack date. For example, the audio file may be in the format of MIDI (Musical Instrument Digital Interface) that includes both header data and soundtrack data. In particular, the header data records the formation of the audio file as well as multiple parameters such as BPM (Beats Per Minute) representing the play speed of the audio file. In some embodiments, the soundtrack data includes information about the type of instruments for playing music notes corresponding to a particular event, the pitch of the tone, the accompany information as well as the time slice information associated with the event. The input of the soundtrack data into a synthesizer generates the play of a particular music note or notes associated with the event.

In some embodiments, the event distribution information generation module 210 determines the event-triggering time of a particular event in the audio file based on the parameters in the header data and the time slice information of the event in the soundtrack data. Such event-triggering time is then used for generating the event distribution information. Besides the event-triggering time, the event distribution information also includes information indicating the time length of this event, which is used for controlling the time length of playing music notes associated with the event as well as the time length of displaying the event location on the graphical user interface. In some embodiments, the time length of this event is determined by subtracting the event's start time from its termination time provided by the soundtrack data.

Figure 5:
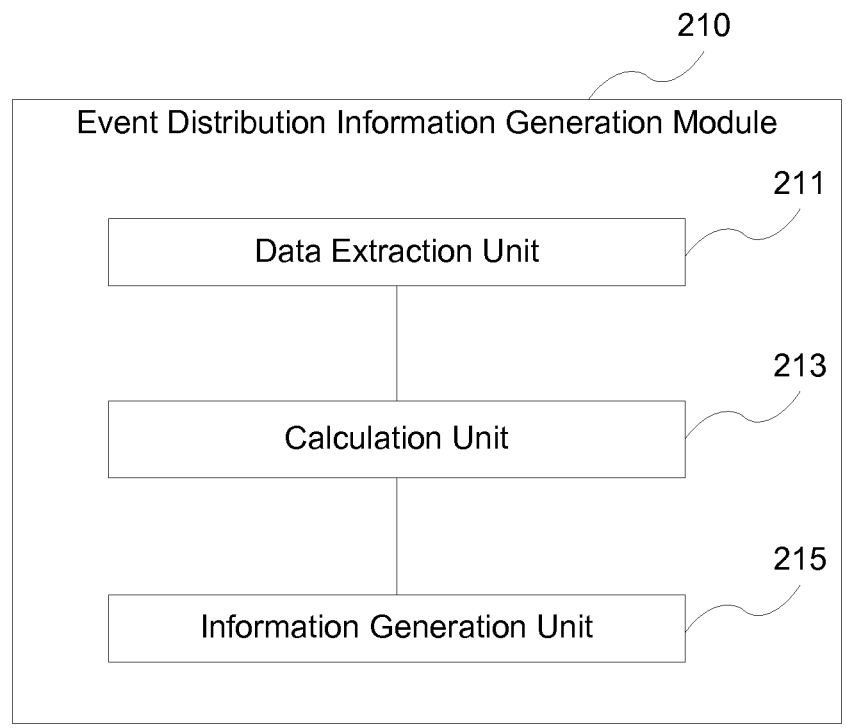
FIG. 5 is a block diagram illustrative of the components of an event distribution information generation module shown in FIG. 4 in accordance with some embodiments.

FIG. 5 is a block diagram illustrative of the components of an event distribution information generation module shown in FIG. 4 in accordance with some embodiments. In this example, the event distribution information generation module 210 further includes a data extraction unit 211, a calculation unit 213, and an information generation unit 215.

The data extraction unit 211 is configured to extract the header data and the soundtrack data from the audio file, which are used for generating the event distribution information as described above. The calculation unit 213 is configured to extract the time slice information of an event from the soundtrack data and then determines the event's event-triggering time based, at least in part, on the header data and the time slice information. In some embodiments, the unit for the time slice information in the audio file is the number of ticks. As such, the event-triggering time indicates when an event should occur after a predefined number of ticks. In some embodiments, the application determines the unit of a tick in time based on parameters such as BPM in the header data of the audio file. Next, the application extracts the time slice information from the soundtrack and the parameters from the header data and uses such information to determine an event-triggering time for each event identified in the audio file.

The information generation unit 215 is configured to generate the event distribution information using the event-triggering times determined in the previous steps. In some embodiments, there is a counterpart in the event distribution information for every event in the audio file. The event distribution information is then used for controlling the event locations during the play of the audio file as described above. In some embodiments, a soundtrack event distribution set is generated by storing the event-triggering times corresponding to different events in the set in the binary stream format in order to save the storage space. More specifically, since an audio file may include multiple sound tracks, the event distribution information is generated by combining multiple soundtrack event distribution sets, one for each soundtrack.

Figure 6:
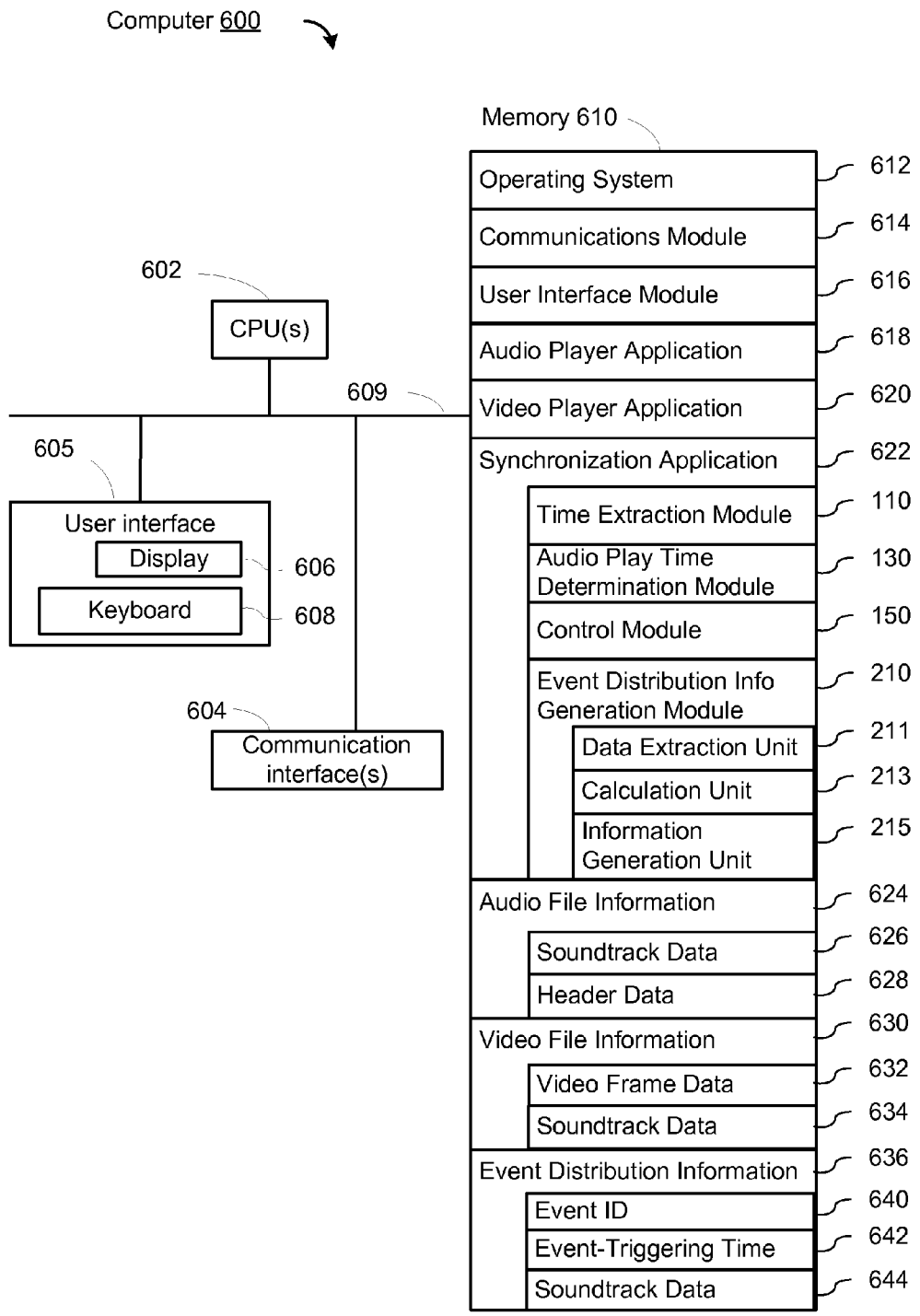
FIG. 6 is a block diagram illustrative of the components of a computing device in accordance with some embodiments.

FIG. 6 is a block diagram illustrative of the components of a computing 600 device in accordance with some embodiments. The computing device 600 typically includes one or more processing units (CPU's) 602, one or more network or other communications interfaces 604, memory 610, and one or more communication buses 609 for interconnecting these components. The communication buses 609 may include circuitry (sometimes called a chipset) that interconnects and controls communications between system components. The computing device 600 may include a user input device 605, for instance, a display 606 and a keyboard 608. Memory 610 may include high speed random access memory and may also include non-volatile memory, such as one or more magnetic disk storage devices. Memory 610 may include mass storage that is remotely located from the CPU's 602. In some embodiments, memory 602, or alternately the non-volatile memory device(s) within memory 602, comprises a non-transitory computer readable storage medium. Memory 602 or the computer readable storage medium of memory 602 stores the following elements, or a subset of these elements, and may also include additional elements:

- an operating system 612 that includes procedures for handling various basic system services and for performing hardware dependent tasks;
- a network communication module 614 that is used for connecting the computing device 600 to a remote server (e.g., a on-line game server) or other computers via one or more communication networks (wired or wireless), such as the Internet, other wide area networks, local area networks, metropolitan area networks, and so on;
- a user interface module 616 configured to receive user inputs through the user interface 605; and
- an audio player application 618 for playing an audio file: in some embodiments, the audio player application 618 is a standalone application; in some other embodiments, the audio player application 618 is a component of another application (e.g., a music game application);
- a video player application 620 for playing a video file, e.g., in a frame-by-frame manner: in some embodiments, the video player application 620 is a standalone application; in some other embodiments, the video player application 620 is a component of another application (e.g., a music game application);
- a synchronization application 622 for controlling the display of event locations on a graphical user interface in accordance with an audio file: in some embodiments, the synchronization application 622 is a standalone application; in some other embodiments, the synchronization application 622 is a component of another application (e.g., a music game application); the synchronization application 622 further including:
  - a time extraction module 110 as described above in connection with FIGS. 1 and 3;
  - an audio play time determination module 130 as described above in connection with FIGS. 1 and 3;
  - a control module 150 as described above in connection with FIGS. 1 and 3; and
  - an event distribution information generation module 210 that includes a data extraction unit 211, a calculation unit 213, and an information generation unit 215 as described above in connection with FIGS. 4 and 5;
- audio file information 624 further including soundtrack data 626 and header data 628 as described above in connection with FIGS. 1 and 2;
- video file information 630 further including video frame data 632 and soundtrack data 634 as described above in connection with FIGS. 1 and 2; and
- event distribution information 636 further including an event identifier 640, an event-triggering time 642, and soundtrack data 644.

Note that the aforementioned method and system retrieve the event-triggering times from an audio file and the play time of the audio file and control the display of the event locations on the graphical user interface by comparing the event-triggering times and the play time. Because the play time is not a result of accumulating the times associated with different frames but corresponds to the current play position of the audio file, the time gap between the play time and event-triggering times associated with the conventional approach can be effectively avoided.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a computer having one or more processors and memory storing programs executed by the one or more processors and a display,
   extracting header data and soundtrack data from an audio file;
   generating event distribution information based on the header data and the soundtrack data;
   extracting a predefined number of event-triggering times from the event distribution information, wherein the event distribution information is associated with the audio file currently played on the computer and the event-triggering times are arranged in a sequential order;
   determining a current play time for the audio file; and
   controlling event locations corresponding to user inputs on the display of the computer based on a comparison of the current play time and the extracted event-triggering times.

2. The computer-implemented method of claim 1, wherein extracting the predefined number of event-triggering times from event distribution information further includes:
   determining a video frame of a video file currently played on the computer, wherein the video file is associated with the audio file;
   identifying soundtrack data corresponding to the video frame; and
   identifying one or more events corresponding to the soundtrack data in the event distribution information, each event having an associated event-triggering time.

3. The computer-implemented method of claim 1, wherein controlling the events corresponding to the user inputs on the display of the computer further includes:
   comparing the current play time and a respective event-triggering time;
   if the current play time is before the respective event-triggering time, displaying a visual indicator corresponding to a user input triggered by an event associated with the respective event-triggering time; and
   if the current play time is after the respective event-triggering time, ceasing the display of a visual indicator corresponding to a user input triggered by an event associated with the respective event-triggering time.

4. The computer-implemented method of claim 1, further comprising:
   identifying an event's corresponding time slice information in the soundtrack data;
   determining the event's event-triggering time based on the header data and the time slice information; and
   generating the event distribution information based on the event's event-triggering time.

5. The computer-implemented method of claim 4, further comprising:
   adding the event's event-triggering time and the corresponding soundtrack data to a binary-format soundtrack-event distribution set, wherein the binary-format soundtrack-event distribution set constitutes as the event distribution information associated with the audio file.

6. A computer system, comprising:
   one or more processors;
   memory;
   a display; and
   one or more programs stored in the memory and configured for execution by the one or more processors, the one or more programs including instructions for:
   extracting header data and soundtrack data from an audio file;
   generating event distribution information based on the header data and the soundtrack data;
   extracting a predefined number of event-triggering times from the event distribution information, wherein the event distribution information is associated with the audio file currently played on the computer and the event-triggering times are arranged in a sequential order;
   determining a current play time for the audio file; and
   controlling event locations corresponding to user inputs on the display of the computer based on a comparison of the current play time and the extracted event-triggering times.

7. The computer system of claim 6, wherein the instruction for extracting the predefined number of event-triggering times from event distribution information further includes instructions for:
   determining a video frame of a video file currently played on the computer, wherein the video file is associated with the audio file;
   identifying soundtrack data corresponding to the video frame; and
   identifying one or more events corresponding to the soundtrack data in the event distribution information, each event having an associated event-triggering time.

8. The computer system of claim 6, wherein the instruction for controlling the events corresponding to the user inputs on the display of the computer further includes instructions for:
   comparing the current play time and a respective event-triggering time;
   if the current play time is before the respective event-triggering time, displaying a visual indicator corresponding to a user input triggered by an event associated with the respective event-triggering time; and
   if the current play time is after the respective event-triggering time, ceasing the display of a visual indicator corresponding to a user input triggered by an event associated with the respective event-triggering time.

9. The computer system of claim 6, wherein the one or more programs further include instructions for:
   identifying an event's corresponding time slice information in the soundtrack data;
   determining the event's event-triggering time based on the header data and the time slice information; and
   generating the event distribution information based on the event's event-triggering time.

10. The computer system of claim 9, wherein the one or more programs further include instructions for:
    adding the event's event-triggering time and the corresponding soundtrack data to a binary-format soundtrack-event distribution set, wherein the binary-format soundtrack-event distribution set constitutes as the event distribution information associated with the audio file.

11. A non-transitory computer readable storage medium, storing one or more programs for execution by one or more processors of a computer having a display, the one or more programs including instructions for:
    extracting header data and soundtrack data from an audio file;
    generating event distribution information based on the header data and the soundtrack data;

extracting a predefined number of event-triggering times from the event distribution information, wherein the event distribution information is associated with the audio file currently played on the computer and the event-triggering times are arranged in a sequential order;

determining a current play time for the audio file; and controlling event locations corresponding to user inputs on the display of the computer based on a comparison of the current play time and the extracted event-triggering times.

12. The non-transitory computer readable storage medium of claim 11, wherein the instruction for extracting the predefined number of event-triggering times from event distribution information further includes instructions for:

determining a video frame of a video file currently played on the computer, wherein the video file is associated with the audio file;

identifying soundtrack data corresponding to the video frame; and identifying one or more events corresponding to the soundtrack data in the event distribution information, each event having an associated event-triggering time.

13. The non-transitory computer readable storage medium of claim 11, wherein the instruction for controlling the events corresponding to the user inputs on the display of the computer further includes instructions for:

comparing the current play time and a respective event-triggering time;

if the current play time is before the respective event-triggering time, displaying a visual indicator corresponding to a user input triggered by an event associated with the respective event-triggering time; and if the current play time is after the respective event-triggering time, ceasing the display of a visual indicator corresponding to a user input triggered by an event associated with the respective event-triggering time.

14. The non-transitory computer readable storage medium of claim 11, wherein the one or more programs further include instructions for:

identifying an event's corresponding time slice information in the soundtrack data;

determining the event's event-triggering time based on the header data and the time slice information; and generating the event distribution information based on the event's event-triggering time.

15. The non-transitory computer readable storage medium of claim 14, wherein the one or more programs further include instructions for:

adding the event's event-triggering time and the corresponding soundtrack data to a binary-format soundtrack-event distribution set, wherein the binary-format soundtrack-event distribution set constitutes as the event distribution information associated with the audio file.

* * * * *